United States Patent
Sun et al.

(10) Patent No.: US 10,484,234 B1
(45) Date of Patent: Nov. 19, 2019

(54) DYNAMIC LOGGING FRAMEWORK FOR MULTI-TENANT CLOUD ENVIRONMENT

(71) Applicant: SAP SE, Walldorf (DE)

(72) Inventors: Xun Sun, Shanghai (CN); Hao Weng, Shanghai (CN); Xiaoxiao Gu, Shanghai (CN); You Li, Shanghai (CN)

(73) Assignee: SAP SE, Walldorf (DE)

( * ) Notice: Subject to any disclaimer, the term of this patent is extended or adjusted under 35 U.S.C. 154(b) by 45 days.

(21) Appl. No.: 16/004,905

(22) Filed: Jun. 11, 2018

(51) Int. Cl.
| | |
|---|---|
| *G06F 15/173* | (2006.01) |
| *H04L 12/24* | (2006.01) |
| *H04L 29/08* | (2006.01) |
| *G06F 21/62* | (2013.01) |

(52) U.S. Cl.
CPC ...... *H04L 41/0631* (2013.01); *G06F 21/6245* (2013.01); *H04L 41/069* (2013.01); *H04L 67/10* (2013.01); *G06F 2221/2137* (2013.01)

(58) Field of Classification Search
CPC ... H04L 41/0631; H04L 41/069; H04L 67/10; G06F 21/6245; G06F 2221/2137
See application file for complete search history.

(56) References Cited

U.S. PATENT DOCUMENTS

| | | | | |
|---|---|---|---|---|
| 2011/0110568 | A1* | 5/2011 | Vesper | G06F 19/321 |
| | | | | 382/128 |
| 2013/0198801 | A1* | 8/2013 | Nishizawa | H04L 29/06768 |
| | | | | 726/1 |
| 2014/0013308 | A1* | 1/2014 | Gounares | H04L 41/0806 |
| | | | | 717/125 |
| 2014/0281741 | A1* | 9/2014 | Bohacek | G06F 11/3409 |
| | | | | 714/47.3 |
| 2014/0316926 | A1* | 10/2014 | Gounares | G06Q 30/0611 |
| | | | | 705/26.4 |
| 2018/0067811 | A1* | 3/2018 | Mowatt | G06F 11/142 |
| 2019/0225458 | A1* | 7/2019 | Nanjappan | B66B 1/3407 |

FOREIGN PATENT DOCUMENTS

CN 102523247 B * 9/2014

OTHER PUBLICATIONS

Ahossin, "IBM Performance Management v8.1.3: Running the CollectLogs script", Mar. 31, 2017, Application Performance Management, 3 pages.*
Eselyn, "How to Configure SAP Enterprise Threat Detection for Increased Surveillance and Real-Time Analysis of Security Threats", Apr. 14, 2016, SAP Insider, 41 Pages.*

* cited by examiner

*Primary Examiner* — Richard G Keehn
(74) *Attorney, Agent, or Firm* — Schwegman Lundberg & Woessner, P.A.

(57) ABSTRACT

Systems and methods are provided for receiving a notification of an issue with a cloud services application, determining that troubleshooting of the issue comprises review of server logs containing personal data, enabling a data protection and privacy log level instead of a default log level to capture the personal data, generating the one or more server logs containing personal data during replication of the issue based on detecting that the data protection and privacy log level is enabled, indexing the one or more server logs containing personal data and setting access permission to the one or more server logs, detecting that a specified retention time period for the personal data has lapsed, automatically purging the personal data of the one or more server logs based on detecting that the specified retention time period has lapsed, and recording a record that the personal data has been purged.

20 Claims, 6 Drawing Sheets

DYNAMIC LOGGING FRAMEWORK FOR MULTI-TENANT CLOUD ENVIRONMENT

BACKGROUND

Compared to on-premise solutions, cloud solutions have unique data protection and privacy challenges. For example, server logs are important in cloud solution operation for monitoring and troubleshooting. If user personal data is output into server logs, however, the server logs need to be handled carefully to ensure data protection and privacy compliance.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to a dynamic logging framework for a multi-tenant cloud environment that allows for monitoring and troubleshooting while also protecting user personal data in the process. Cloud platforms, such as software-as-a-service cloud platforms, are responsible for both maintaining and operating cloud solutions. Accordingly, server logs are an important operational data source to do root cause analysis and troubleshooting. For server logs to be useful, sufficient information needs to be included. These server logs, however, can contain user personal data, and thus, need to be carefully handled for data protection and privacy.

Example embodiments address the technical challenges of protecting user personal information by providing a dynamic logging framework for data protection and privacy to fulfill the needs of troubleshooting information while protecting user personal data in the process. For example, some example embodiments allow logging of user personal data to be turned on at runtime and on demand. In this way, personal data is only logged and accessible when necessary to debug a particular issue and then can be purged after the issue is debugged. Some example embodiments further allow for multi-tenant security such that configuration of one tenant does not affect other tenants and personal data of tenants are handled separately in server logs.

Figure 1:
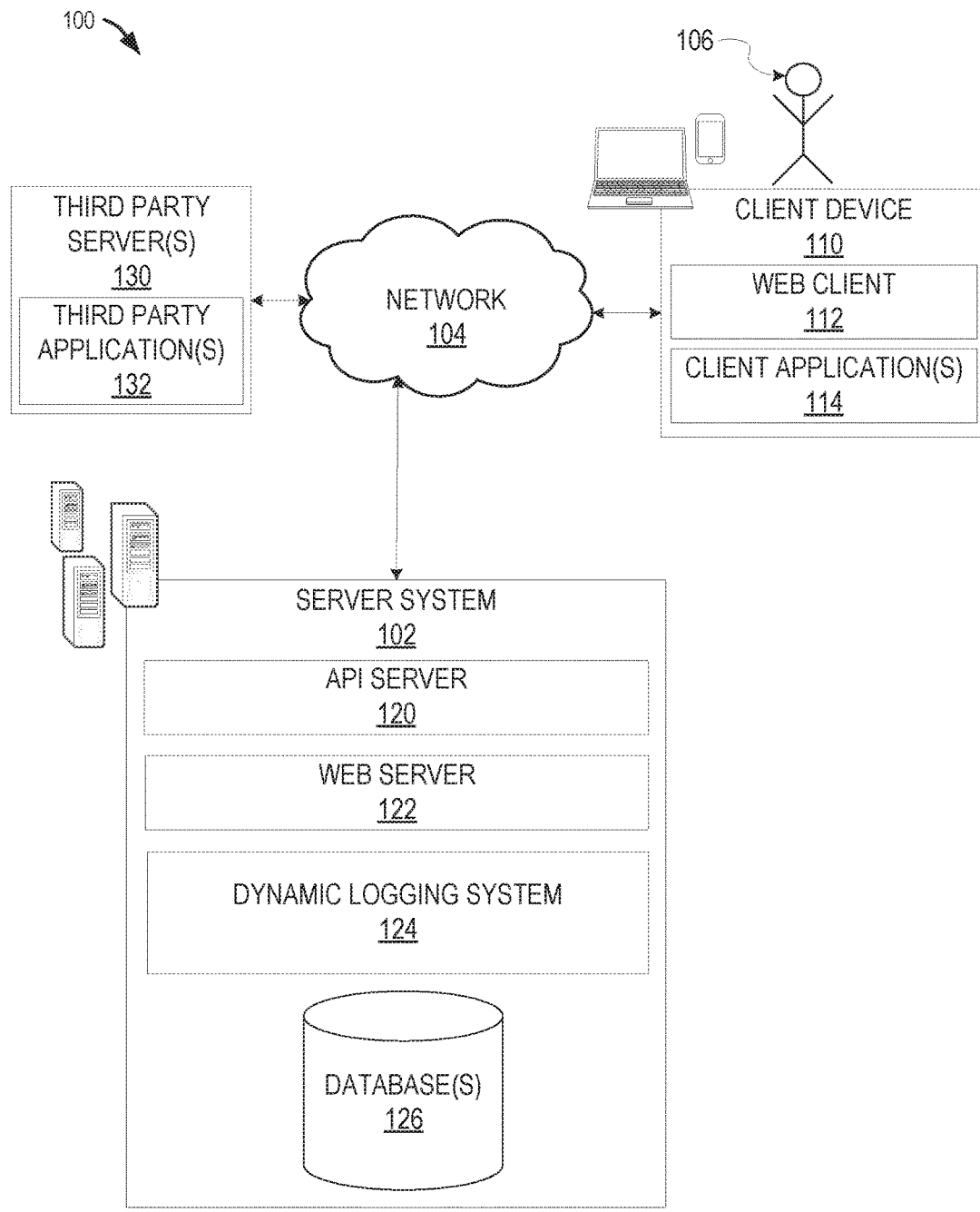
FIG. 1 is a block diagram illustrating a networked system, according to some example embodiments.

FIG. 1 is a block diagram illustrating a networked system 100, according to some example embodiments, configured to detect security-relevant code changes in source code. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to access and utilize cloud services, among other applications.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, enterprise resource planning (ERP) application, customer relationship management (CRM) application, log management tool, and the like.

In some embodiments, one or more client applications 114 may be included in a given one of the client device 110, and configured to locally provide the user interface and at least some of the functionalities, with the client application 114 configured to communicate with other entities in the system 100 (e.g., third-party servers 130, server system 102, etc.), on an as needed basis, for data and/or processing capabilities not locally available (e.g., access location information, access software version information, access an ERP system, access a CRM system, to authenticate a user 106, to verify a method of payment, etc.). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and dynamic logging system 124, that may be communicatively coupled with one or more databases 126.

The one or more databases 126 may be storage devices that store data related to users of the system, applications associated with the system, cloud services, and so forth. The one or more databases 126 may further store information related to third-party servers 130, third-party applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The dynamic logging system 124 may provide back-end support for third-party applications 132 and client applications 114, which may include cloud-based applications. The dynamic logging system 124 may process requests for generating one or more server logs, request for personal data logging, enable personal data logging, generate one or more server logs, and so forth, as described in further detail below. The dynamic logging system 124 may comprise one or more servers or other computing devices or systems.

The system 100 may further include one or more third-party servers 130. The one or more third-party servers 130 may include one or more third-party application(s) 132. The one or more third-party application(s) 132, executing on third-party server(s) 130, may interact with the server system 102 via. API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide software version analysis functionality that is supported by relevant functionality and data in the server system 102.

Figure 2:
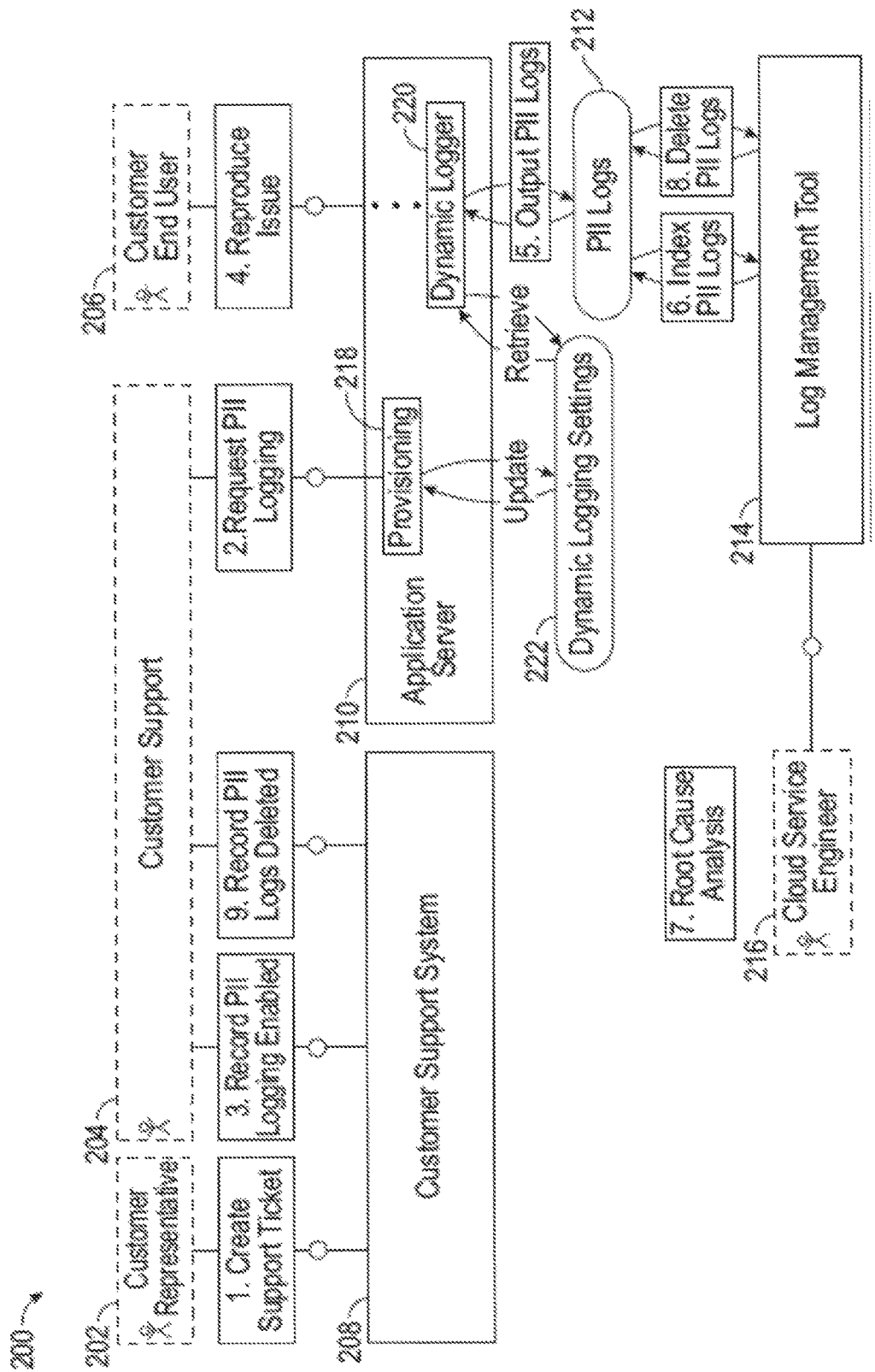
FIG. 2 is a block diagram illustrating a dynamic logging framework, according to some example embodiments.

FIG. 2 is a block diagram illustrating a dynamic logging framework 200, according to some example embodiments. The dynamic logging framework 200 may comprise the dynamic logging system 124. For example, the dynamic logging system 124 may comprise a customer support system 208, an application server 210, personal data or personally identifiable information (PII) logs 212, and a log management tool 214, in some example embodiments. The dynamic logging framework 200 may comprise one or more server computers or other computing device or system.

The application server 210 may comprise one or more server computers or other computing device or system for providing services to one or more entities (e.g., customers). An entity or customer may be a business or other organization that utilizes cloud services. The entity may have one or more users 206 accessing and using the cloud services. The one or more users 206 may interact with the application server 210. The application server 210 may comprise a provisioning component 218 and a dynamic logger 220 that may access one or more dynamic logging settings 222, as explained in further detail below.

The customer support system 208 is a platform comprising one or more server computers or other computing device or system for providing support to an entity or user when using cloud services. In one example, the customer support system 208 provides a platform for an entity or user to report problems and request support when using cloud services.

The log management tool 214 is a tool used by one or more engineers to consolidate server logs, search for events, and perform root cause analysis. The personally identifiable information (PII) logs 212 are server logs comprising personal data or PII. Personal data and PII are used interchangeably herein.

In one example, a user such as an entity or customer representative 202 may report problems and provide feedback on behalf of the entity. A user such as a customer end user 206 is a user of the cloud services.

Customer support 204 represents the cloud services platform to provide support to the entity or customer. The cloud services engineer 216 is a user associated with the cloud services platform that has monitoring and/or troubleshooting responsibility.

At a high level (1) a customer support representative 202 creates a support ticket, (2) customer support 204 requests PII logging, (3) record of PII logging is enabled, (4) a customer end user 206 reproduces the issue reported, (5) the PII logs 212 are output by the dynamic logger 220 and (6) the PII logs 212 are indexed, (7) a cloud services engineer 216 performs root cause analysis, (8) the PII, logs 212 are deleted, and (9) record of PII logs 212 deleted. Further detail is described below with respect to FIG. 3.

Figure 3:
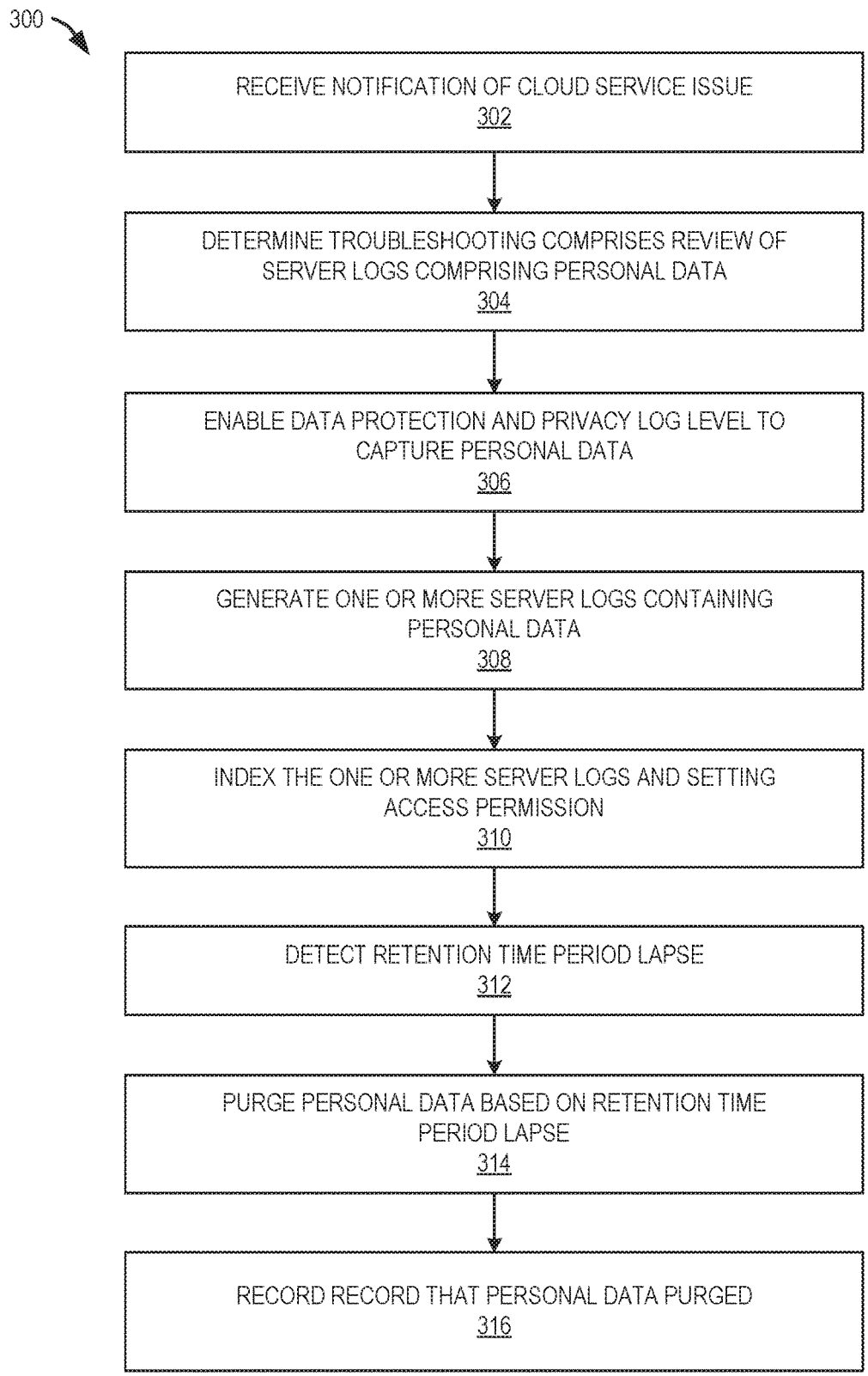
FIG. 3 is flowchart illustrating aspects of a method, according to some example embodiments.

FIG. 3 is a flow chart illustrating aspects of a method 300 for dynamic logging, according to some example embodiments. For illustrative purposes, method 300 is described with respect to the networked system 100 of FIG. 1 and example block diagram in FIG. 2. It is to be understood that method 300 may be practiced with other system configurations in other embodiments.

In operation 302, a server system (e.g., server system 102, dynamic logging system 124, etc.) receives a notification of an issue with a cloud services application. For example, an entity or customer representative 202 may create a support ticket for an issue occurring in an application. Creating the ticket may comprise sending a notification from a computing device associated with the entity to the server system (e.g., via customer support system 208). The notification may comprise further details such as information about the issue, entity name and/or identifier, requester name or identifier, application name, application version number, among other data.

In operation 304, the server system may determine that troubleshooting of the issue comprises review of server logs comprising personal data. For example, the server system may analyze the notification of the issue and determine that troubleshooting the issue will comprise review of logged personal data to determine the cause of the issue. This may be determined based on the nature of the issue, information in the notification specifying a request for personal data to be logged, the particular type of application or module of the application or service, and so forth.

In operation 306, the server system enables (e.g., sets or selects) a data protection and privacy log level instead of a default log level to capture the personal data. For example, the server system may have a default level logging that is not set to log any personal data (e.g., sensitive data). A data privacy and protection log level may be set to allow capture and output of one or more log entries comprising personal data. The dynamic logging settings including the enabled personal data logging, may be replicated to all servers who may perform logging (e.g., all application servers 210).

In one example the server system may utilize Apache Log4j as a logging facility. Apache Log4j is a Java-based logging utility and has the following logging levels: TRACE>DEBUG>INFO>WARN>ERROR>FATAL. Where TRACE logs the most detail and FATAL the least detail. In one example embodiment, personal data logging may be set to a first log level, such as a DEBUG level, and the default level set to a second log level, such as the INFO level. When the INFO log level is set, logs of INFO, WARN, ERROR, and FATAL levels will be output. Logs of higher levels (e.g., TRACE and DEBUG in this example) are not output. Thus, unless the server system specifically enables logging at the DEBUG level, system logs will be generated at the INFO level and will not include personal data. In this way, the server system may enable logging of personal data in a runtime request and sensitive data is only accessible when needed to debug a particular issue.

In one example embodiment, a customized log level may be introduced and output of log entries comprising personal data may be in the customized log level. For example, the log levels may comprise: TRACE>DPP>DEBUG>INFO>WARN>ERROR>FATAL, where DPP (e.g., data protection and privacy) is the customized log level. In one example, DPP type logs (e.g., or DEBUB type logs) may be output to an individual folder for a particular tenant so that the logs can be managed in a multi-tenant way. The one or more server logs associated with a particular tenant may not accessible by other tenants in a multi-tenant system.

In one example, a request to enable server logs containing personal data may be generated by a computing device associated with a customer support user 204. The server system may receive the request to enable the server logs and then enable the log level to capture the personal data instead of the default log level, as explained above.

Enabling the log level to capture the personal data may further comprise enabling the server logs for a particular tenant associated with the issue, for a particular user associated with the issue (e.g., an end user 206), for a particular feature or module in the application/services associated with the issue, and so forth. Enabling the log level to capture the personal data may further comprise enabling access to the server log for a particular user to trouble shoot the issue (e.g., cloud service engineer 216). For example, one or more particular users may be authorized to access the server logs containing personal data. In this example, if a user tries to access the server logs containing personal data, the server system will determine that the user is authorized to access before granting access to the server logs containing personal data. If the user is not authorized, the user will be denied access.

Enabling the log level to capture the personal data may further comprise specifying the server logs containing personal data be enabled for a specified time period, specifying the server logs containing personal data be retained for a specified time, after which the personal data and/or server logs will be deleted, and so forth. The personal data may also be deleted sooner based on receiving an indication that the issue is resolved or that that the personal data is no longer needed.

In one example, the server system may record (e.g., add a note or comment to a support ticket) that PII has been enabled for the support ticket. In another example, a customer support user 204 may be notified by the server system that PII has been enabled (e.g., via the updated support ticket or other method).

In operation 308, the server system generates one or more server logs containing the personal data during replication of the issue, based on detecting that the data protection and privacy log level is enabled (e.g., instead of the default log level). For example, a customer end user 206 or customer representative 202, via a computing device, may interact with the application or service to reproduce the issue and the server system may generate the one or more server logs containing the personal data (e.g., at the data protection and privacy log level instead of the default level) based on the interaction of the user with the computing device and any data generated on the computing device or server system based on the interaction.

In one example, the server system may output the one or more server logs containing personal data to a separate file for the particular entity (e.g., company or organization) and/or user along with additional information, such as specified time period for the data protection and privacy log level to be enabled, specified retention time period of the personal data, any authorized users that may access the personal data (e.g., to do a root cause analysis of the issue), and so forth.

In one example, the additional information may be included in a configuration file. For example, the configuration data of the configuration file may comprise enabling the server logs for tenant associated with the issue, enabling the server logs for a user associated with the issue, enabling the server logs for a software module associated with issue, enabling access to the server logs only for a particular user to troubleshoot the issue, a specified time period for enablement of logging, a specified time period for retention of the one or more server logs. An example configuration file may comprise the following information:

| Key | Value Description | Required |
| --- | --- | --- |
| tenantId | Tenant Id | Yes |
| User Id | User Id | No |
| moduleName | Module/feature name | Yes |
| level | Log level | Yes |
| startTime | Configuration effective time | No, default to current time |
| stopTime | Configuration valid time period | No, default to 1 hour, one week is maximum value |
| retentionTime | How long should system keep personal data server logs | Yes, one month is maximum value |
| accessUserIdList | List of User Ids who have access to the generated personal data logs from log management tool. | Yes |

In operation 310, the server system indexes the one or more server logs containing personal data and sets access permission to the one or more server logs. The one or more server logs may then be displayed on a computing device (e.g., associated with a cloud services engineer 216 or other authorized user) to examine for root cause analysis (e.g., via a log management tool 214).

In operation 312, the server system detects that a specified retention time period for the personal data has lapsed (e.g., 1 day, 48 hours, 1 week, 1 month, etc.). In operation 314, the server system automatically purges the personal data of the one or more server logs based on detecting that the specified retention time period has lapsed. In one example, only the personal data of the one or more server logs is purged or deleted. In another example, purging the personal data of the one or more server logs comprises deleting the one or more server logs.

In operation 316, the server system records a record that the personal data has been purged. For example, the server system may add a comment to the support ticket indicating that the personal data and/or server logs have been deleted.

Figure 4:
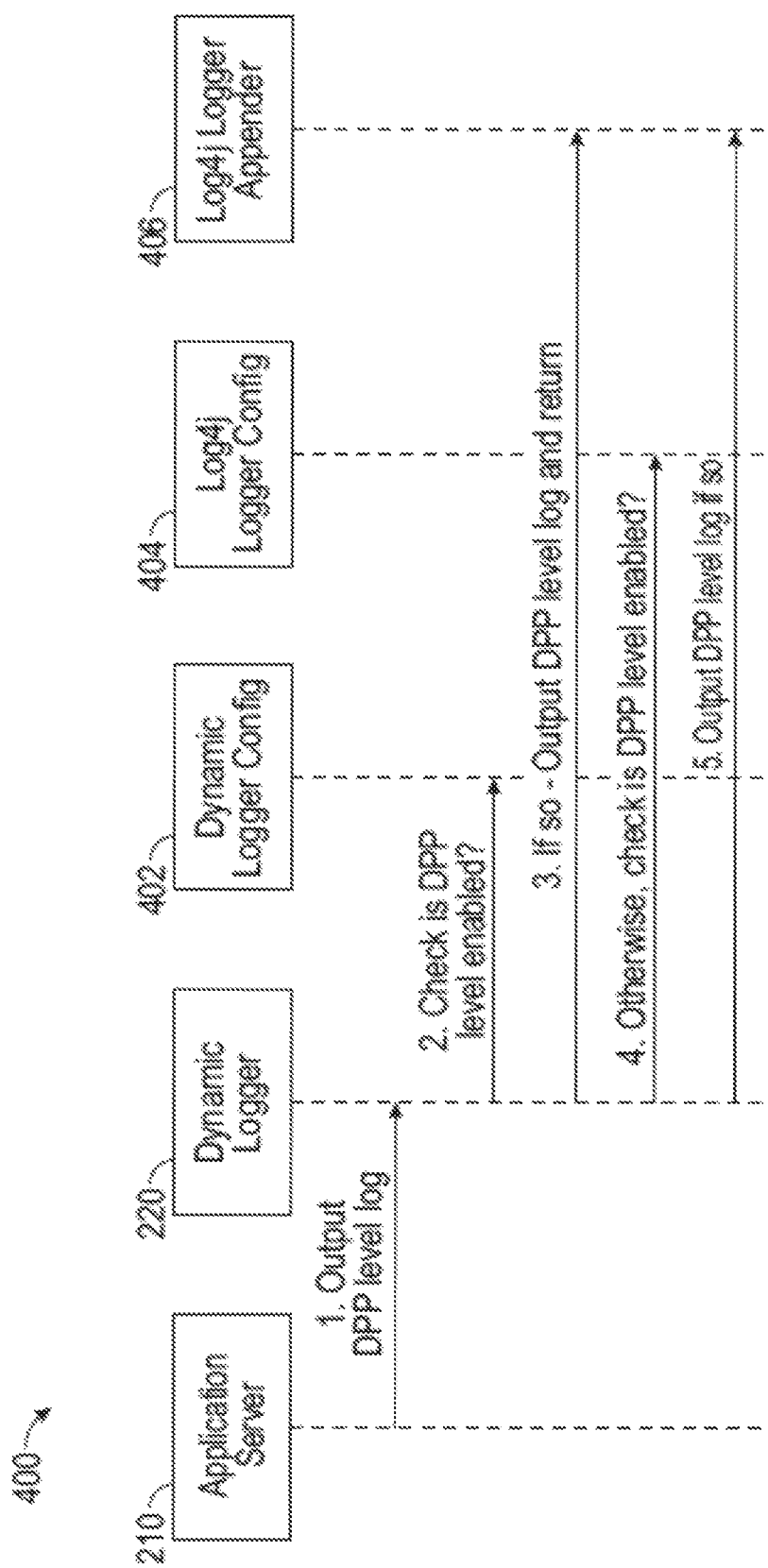
FIG. 4 is a diagram illustrating an example of a logger configuration workflow, according to some example embodiments.

In one example, a dynamic logging configuration mechanism adds an extra logger configuration on top of the system platform logger. The extra configuration logger then allows changing the log level at runtime without a server restart. FIG. 4 is a diagram 400 illustrating an example of the extra logger configuration's workflow. On top of the Log4jLogger configuration 404, which is fixed at server startup time, the dynamic logging configuration mechanism has the DynamicLogger configuration 220 that can change at runtime. When the application server 210 tries to write a log at the DPP level (or other level that logs personal or sensitive data), the dynamic logger checks settings in both configurations sequentially. The log is written if either setting is enabled.

Accordingly, example embodiment allow privacy by default by setting default logging to not include personal data (e.g., personal data is not recorded in plaintext in server logs). Instead, personal data log entries can be turned on or off independently from other logs. Moreover, personal data log entries have their own specific log level (e.g., DPP), therefore when lower level of logs are turned on, personal data is not exposed in logs by accident.

Example embodiments allow for the server system to send notification to an entity or user of an event directly impacting user personal data. For example, an entity or user is notified of a beginning and end of their personal data's lifecycle in server logs.

Example embodiments further provide for multi-tenant security by enabling personal logs per tenant, per users, per feature or module, with a definite start and stop time, and so forth. Thus, personal data logs can be enabled per tenant without affecting other tenants. Moreover, personal data logs from different tenants are maintained separately and can be configured to be accessed by different cloud services users.

Example embodiments further provide for retention control by ensuring logs containing personal data have a defined life cycle, and should be deleted when the life cycle is completed. Moreover, access control is provided to ensure only those working on a support ticket have access to logs containing personal data. The retention period and access control may be specified at the beginning and followed by the log management tool.

Example embodiments are described in relation to a cloud service platform. It is understood that example embodiments may also be employed in on-premise scenarios or any platform or system where logging is used and personal data may be included in logging.

Figure 5:
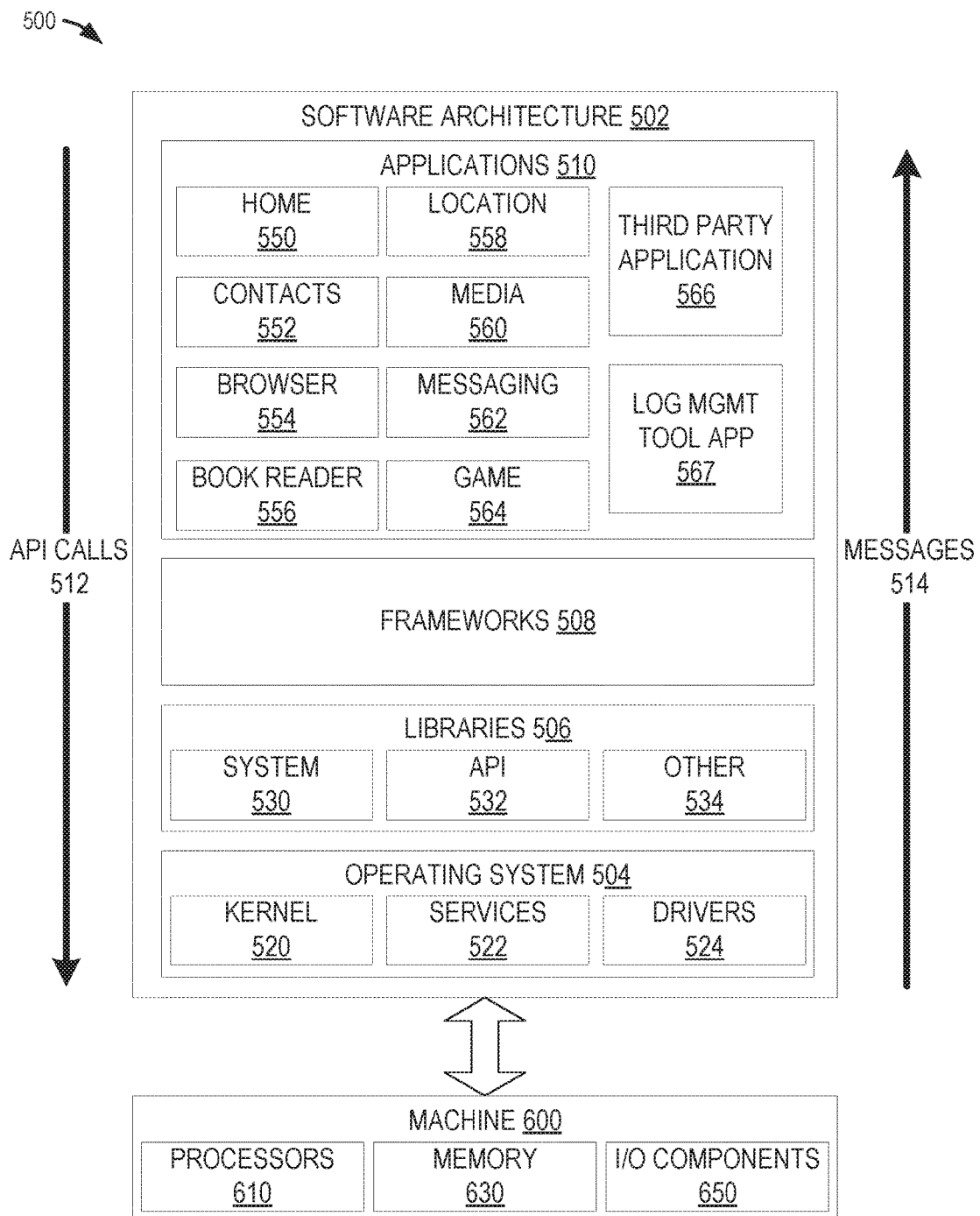
FIG. 5 is a block diagram illustrating an example of a software architecture that may be installed on a machine, according to some example embodiments.

FIG. 5 is a block diagram 500 illustrating software architecture 502, which can be installed on any one or more of the devices described above. For example, in various embodiments, client devices 110 and servers and systems 130, 102, 120, 122, and 124 may be implemented using some or all of the elements of software architecture 502. FIG. 5 is merely a non-limiting example of a software architecture, and it will be appreciated that many other architectures can be implemented to facilitate the functionality described herein. In various embodiments, the software architecture 502 is implemented by hardware such as machine 600 of FIG. 6 that includes processors 610, memory 630, and I/O components 650. In this example, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or PG), or Portable Network Graphics (MG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Some embodiments may particularly include a log management tool application 567. In certain embodiments, this may be a stand-alone application that operates to manage communications with a server system such as third-party servers 130 or server system 102. In other embodiments, this functionality may be integrated with another application. The log management tool application 567 may request and display various data related to logging and may provide the capability for a user 106 to input data related to the objects via a touch interface, keyboard, or using a camera device of machine 600, communication with a server system via I/O components 650, and receipt and storage of object data in memory 630. Presentation of information and user inputs associated with the information may be managed by log management tool application 567 using different frameworks 508, library 506 elements, or operating system 504 elements operating on a machine 600.

Figure 6:
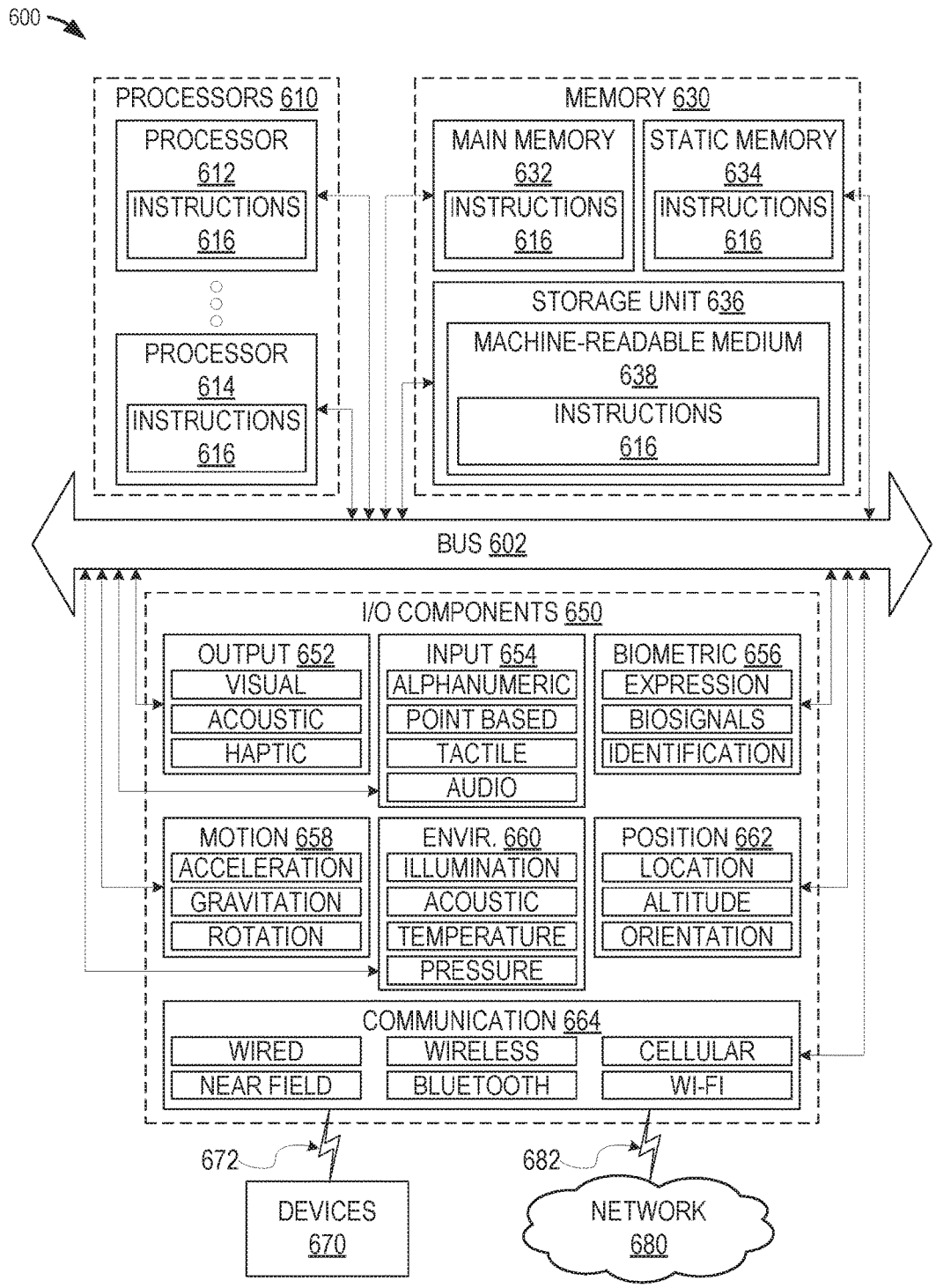
FIG. 6 illustrates a diagrammatic representation of a machine, in the form of a computer system, within which a set of instructions may be executed for causing the machine to perform any one or more of the methodologies discussed herein, according to an example embodiment.

FIG. 6 is a block diagram illustrating components of a machine 600, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application 510, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine 130, 102, 120, 122, 124, etc., or a client device 110 in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly, execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute instructions 616 contemporaneously. Although FIG. 6 shows multiple processors 610, the machine 600 may include a single processor 610 with a single core, a single processor 610 with multiple cores (e.g., a multi-core processor 610), multiple processors 612, 614 with a single core, multiple processors 612, 614 with multiples cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 650 include biometric components 656, motion components 658, environmental components 660, or position components 662, among a wide array of other components. For example, the biometric components 656 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 include acceleration sensor components (e.g., accelerometer), gravitation sensor components, rotation sensor components (e.g., gyroscope), and so forth. The environmental components 660 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine 600 or any of a wide variety of peripheral devices e.g.; a peripheral device coupled via a Universal Serial Bus (USB)).

Moreover, in some embodiments, the communication components 664 detect identifiers or include components operable to detect identifiers. For example, the communication components 664 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX) Long Term Evolution (LTE) standard, others defined by various standard-setting organizations, other long range protocols, or other data transfer technology.

In example embodiments, the instructions 616 are transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, in other example embodiments, the instructions 616 are transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Furthermore, the machine-readable medium 638 is non-transitory (in other words, not having any transitory signals) in that it does not embody a propagating signal. However, labeling the machine-readable medium 638 "non-transitory" should not be construed to mean that the medium is incapable of movement; the medium 638 should be considered as being transportable from one physical location to another. Additionally, since the machine-readable medium 638 is tangible, the medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
  receiving, by a server system, a notification of an issue with a cloud services application;
  determining, by the server system, that troubleshooting of the issue comprises review of server logs containing personal data;
  enabling, by the server system, a data protection and privacy log level instead of a default log level to capture the personal data;
  generating, by the server system, the one or more server logs containing personal data during replication of the issue based on detecting that the data protection and privacy log level is enabled;
  indexing, by the server system, the one or more server logs containing personal data and setting access permission to the one or more server logs;
  detecting, by the server system, that a specified retention time period for the personal data has lapsed;
  automatically purging, by the server system, the personal data of the one or more server logs based on detecting that the specified retention time period has lapsed; and
  recording; by the server system, a record that the personal data has been purged.

2. The method of claim 1, wherein enabling a data protection and privacy log level instead of a default log level to capture the personal data comprises enabling server logs for at least one of the following: a tenant associated with the issue, for a user associated with the issue, and a software module associated with issue.

3. The method of claim 1, wherein enabling a data protection and privacy log level instead of a default log level to capture the personal data comprises enabling access to the server logs only for a particular user to troubleshoot the issue.

4. The method of claim 1, wherein enabling a data protection and privacy log level instead of a default log level to capture the personal data comprises requesting the server logs containing personal data be enabled for a specified time period.

5. The method of claim 1, wherein enabling a data protection and privacy log level instead of a default log level to capture the personal data comprises requesting the server logs containing personal data be retained for a specified time period after which the server logs are deleted.

6. The method of claim 1, wherein generating the one or more server logs containing personal data during replication of the issue comprises outputting the server logs to a file with additional information comprising configuration data associated with the server logs.

7. The method of claim 6, wherein configuration data comprises at least one of a group comprising: enabling the server logs for a tenant associated with the issue, enabling the server logs for a user associated with the issue, enabling the server logs for a software module associated with issue, enabling access to the server logs only for a particular user to troubleshoot the issue, a specified time period for enablement of logging, a specified time period for retention of the one or more server logs.

8. The method of claim 1, wherein automatically purging the personal data of the one or more server logs based on detecting that the specified retention time period has lapsed comprises deleting the one or more server logs.

9. The method of claim 1, wherein the data protection and privacy log level is a customized log level allowing output of one or more log entries comprising personal data.

10. The method of claim 1, wherein enabling the data protection and privacy log level comprises changing a log level from the default log level that does not log personal data to the data protection and privacy log level that does log personal data.

11. A system comprising:
a memory that stores instructions; and
one or more processors configured by the instructions to perform operations comprising:
receiving a notification of an issue with a cloud services application;
determining that troubleshooting of the issue comprises review of server logs containing personal data;
enabling a data protection and privacy log level instead of a default log level to capture the personal data;
generating the one or more server logs containing personal data during replication of the issue based on detecting that the data protection and privacy log level is enabled;
indexing the one or more server logs containing personal data and setting access permission to the one or more server logs;
detecting that a specified retention time period for the personal data has lapsed;
automatically purging the personal data of the one or more server logs based on detecting that the specified retention time period has lapsed; and
recording a record that the personal data has been purged.

12. The system of claim 11, wherein enabling a data protection and privacy log level instead of a default log level to capture the personal data comprises enabling server logs for at least one of the following: a tenant associated with the issue, for a user associated with the issue, and a software module associated with issue.

13. The system of claim 11, wherein enabling a data protection and privacy log level instead of a default log level to capture the personal data comprises enabling access to the server logs only for a particular user to troubleshoot the issue.

14. The system of claim 11, wherein enabling a data protection and privacy log level instead of a default log level to capture the personal data comprises requesting the server logs containing personal data be enabled for a specified time period.

15. The system of claim 11, wherein enabling a data protection and privacy log level instead of a default log level to capture the personal data comprises requesting the server logs containing personal data be retained for a specified time period after which the server logs are deleted.

16. The system of claim 11, wherein generating the one or more server logs containing personal data during replication of the issue comprises outputting the server logs to a file with additional information comprising configuration data associated with the server logs, wherein configuration data comprises at least one of a group comprising: enabling the server logs for a tenant associated with the issue, enabling the server logs for a user associated with the issue, enabling the server logs for a software module associated with issue, enabling access to the server logs only for a particular user to troubleshoot the issue, a specified time period for enablement of logging, a specified time period for retention of the one or more server logs.

17. The system of claim 11, wherein automatically purging the personal data of the one or more server logs based on detecting that the specified retention time period has lapsed comprises deleting the one or more server logs.

18. The system of claim 11, wherein the data protection and privacy log level is a customized log level allowing output of one or more log entries comprising personal data.

19. The system of claim 11, wherein enabling the data protection and privacy log level comprises changing a log level from the default log level that does not log personal data to the data protection and privacy log level that does log personal data.

20. A non-transitory computer-readable medium comprising instructions stored thereon that are executable by at least one processor to cause a computing device to perform operations comprising:
receiving a notification of an issue with a cloud services application;
determining that troubleshooting of the issue comprises review of server logs containing personal data;
enabling a data protection and privacy log level instead of a default log level to capture the personal data;
generating the one or more server logs containing personal data during replication of the issue based on detecting that the data protection and privacy log level is enabled;
indexing the one or more server logs containing personal data and setting access permission to the one or more server logs;
detecting that a specified retention time period for the personal data has lapsed;
automatically purging the personal data of the one or more server logs based on detecting that the specified retention time period has lapsed; and
recording a record that the personal data has been purged.

* * * * *